(12) United States Patent
Thiebaut et al.

(10) Patent No.: US 10,868,869 B2
(45) Date of Patent: Dec. 15, 2020

(54) METHOD, APPARATUS AND COMPUTER PROGRAM

(71) Applicant: Nokia Technologies Oy, Espoo (FI)

(72) Inventors: Laurent Thiebaut, Antony (FR); Yang Shen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 54 days.

(21) Appl. No.: 16/278,817

(22) Filed: Feb. 19, 2019

(65) Prior Publication Data

US 2019/0260834 A1 Aug. 22, 2019

Related U.S. Application Data

(63) Continuation of application No. PCT/CN2018/076927, filed on Feb. 20, 2018.

(51) Int. Cl.
*H04L 29/08* (2006.01)
*H04L 29/12* (2006.01)
*H04M 7/00* (2006.01)

(52) U.S. Cl.
CPC ............ *H04L 67/141* (2013.01); *H04L 61/20* (2013.01); *H04M 7/00* (2013.01); *H04L 61/6022* (2013.01)

(58) Field of Classification Search
CPC ... H04L 67/141; H04L 61/20; H04L 61/6022; H04M 7/00; H04W 76/11
USPC .......................................................... 709/227
See application file for complete search history.

(56) References Cited

U.S. PATENT DOCUMENTS

2018/0367571 A1* 12/2018 Verma .................... H04L 63/029
2020/0068449 A1* 2/2020 Jin ..................... H04W 36/0022

* cited by examiner

*Primary Examiner* — Tu T Nguyen
(74) *Attorney, Agent, or Firm* — Harrington & Smith (57) ABSTRACT

There is provided a method including determining, at a functional entity of a core network, whether policy requests associated with at least one address used within a session are allowed for the session and, if so, configuring a first associated functional entity of the core network to provide at least one address used within the session for a user equipment associated with the session, receiving the at least one address from the first associated functional entity and providing the at least one address to a second associated functional entity of the core network for storage.

20 Claims, 8 Drawing Sheets

Figure 8

METHOD, APPARATUS AND COMPUTER PROGRAM

CROSS REFERENCE TO RELATED APPLICATION

This patent application is a continuation of International Patent Application Number PCT/CN2018/076927 filed Feb. 20, 2018.

FIELD

The present application relates to a method, apparatus, system and computer program and in particular but not exclusively to 5G core networks.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided a method comprising determining, at a functional entity of a core network, whether policy requests associated with at least one address used within a session are allowed for the session and, if so, configuring a first associated functional entity of the core network to provide at least one address used within the session for a user equipment associated with the session, receiving the at least one address from the first associated functional entity and providing the at least one address to a second associated functional entity of the core network for storage.

The at least one address may comprise a media access control address.

Determining whether policy requests associated with at least one address are allowed may comprise receiving, at the functional entity, an indication when the session is established of whether policy requests associated with at least one address are allowed.

The indication may be received from the second associated functional entity of the core network or from a third associated functional entity of the core network.

The method may comprise determining whether policy requests associated with at least one address are allowed based on the configuration of the functional entity.

The session may be an Ethernet protocol data unit session

The at least one address may be used for associating policy requests with the session.

In a second aspect there is provided a method comprising receiving, from an associated functional entity of a core network, a request to provide at least one address used within the session for a user equipment associated with the session, detecting the at least one address from traffic flow received from the user equipment and providing the at least one address to the associated functional entity of the core network.

The at least one address may comprise a media access control address.

The session may be an Ethernet protocol data unit session

The at least one address may be used for associating policy requests with the session.

In a third aspect there is provided an apparatus, said apparatus comprising means for determining, at a functional entity of a core network, whether policy requests associated with at least one address used within a session are allowed for the session and means for, if so, configuring a first associated functional entity of the core network to provide at least one address used within the session for a user equipment associated with the session, means for receiving the at least one address from the first associated functional entity and means for providing the at least one address to a second associated functional entity of the core network for storage.

The at least one address may comprise a media access control address.

Means for determining whether policy requests associated with at least one address are allowed may comprise means for receiving, at the functional entity, an indication when the session is established of whether policy requests associated with at least one address are allowed.

The indication may be received from the second associated functional entity of the core network or from a third associated functional entity of the core network.

The apparatus may comprise means for determining whether policy requests associated with at least one address are allowed based on the configuration of the functional entity.

The session may be an Ethernet protocol data unit session

The at least one address may be used for associating policy requests with the session.

In fourth aspect there is provided an apparatus, said apparatus comprising means for receiving, from an associated functional entity of a core network, a request to provide at least one address used within the session for a user equipment associated with the session, means for detecting the at least one address from traffic flow received from the user equipment and means for providing the at least one address to the associated functional entity of the core network.

The at least one address may comprise a media access control address.

The session may be an Ethernet protocol data unit session

The at least one address may be used for associating policy requests with the session.

In a fifth aspect there is provided an apparatus, said apparatus comprising at least one processor and at least one memory including a computer program code, the at least one memory and the computer program code configured to, with the at least one processor, cause the apparatus at least to determine, at a functional entity of a core network, whether policy requests associated with at least one address used within a session are allowed for the session and, if so, configure a first associated functional entity of the core network to provide at least one address used within the session for a user equipment associated with the session, receive the at least one address from the first associated functional entity and provide the at least one address to a second associated functional entity of the core network for storage.

The at least one address may comprise a media access control address.

The apparatus may be configured to receive, at the functional entity, an indication when the session is established of whether policy requests associated with at least one address are allowed.

The indication may be received from the second associated functional entity of the core network or from a third associated functional entity of the core network.

The apparatus may be configured to determine whether policy requests associated with at least one address are allowed based on the configuration of the functional entity.

The session may be an Ethernet protocol data unit session

The at least one address may be used for associating policy requests with the session.

In a sixth aspect there is provided an apparatus comprising at least one processor and at least one memory including a computer program code, the at least one memory and the computer program code configured to, with the at least one processor, cause the apparatus at least to receive from an associated functional entity of a core network a request to provide at least one address used within the session for a user equipment associated with the session, detect the at least one address from traffic flow received from the user equipment and provide the at least one address to the associated functional entity of the core network.

The at least one address may comprise a media access control address.

The session may be an Ethernet protocol data unit session

The at least one address may be used for associating policy requests with the session.

In a seventh aspect there is provided a computer program embodied on a non-transitory computer-readable storage medium, the computer program comprising program code for controlling a process to execute a process, the process comprising determining, at a functional entity of a core network, whether policy requests associated with at least one address used within a session are allowed for the session and, if so, configuring a first associated functional entity of the core network to provide at least one address used within the session for a user equipment associated with the session, receiving the at least one address from the first associated functional entity and providing the at least one address to a second associated functional entity of the core network for storage.

The at least one address may comprise a media access control address.

Determining whether policy requests associated with at least one address are allowed may comprise receiving, at the functional entity, an indication when the session is established of whether policy requests associated with at least one address are allowed.

The indication may be received from the second associated functional entity of the core network or from a third associated functional entity of the core network.

The process may comprise determining whether policy requests associated with at least one address are allowed based on the configuration of the functional entity.

The session may be an Ethernet protocol data unit session

The at least one address may be used for associating policy requests with the session.

In an eighth aspect there is provided a computer program embodied on a non-transitory computer-readable storage medium, the computer program comprising program code for controlling a process to execute a process, the process comprising receiving, from an associated functional entity of a core network, a request to provide at least one address used within the session for a user equipment associated with the session, detecting the at least one address from traffic flow received from the user equipment and providing the at least one address to the associated functional entity of the core network.

The at least one address may comprise a media access control address.

The session may be an Ethernet protocol data unit session

The at least one address may be used for associating policy requests with the session.

In a ninth aspect there is provided a computer program product for a computer, comprising software code portions for performing the steps the method of the first aspect or second aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
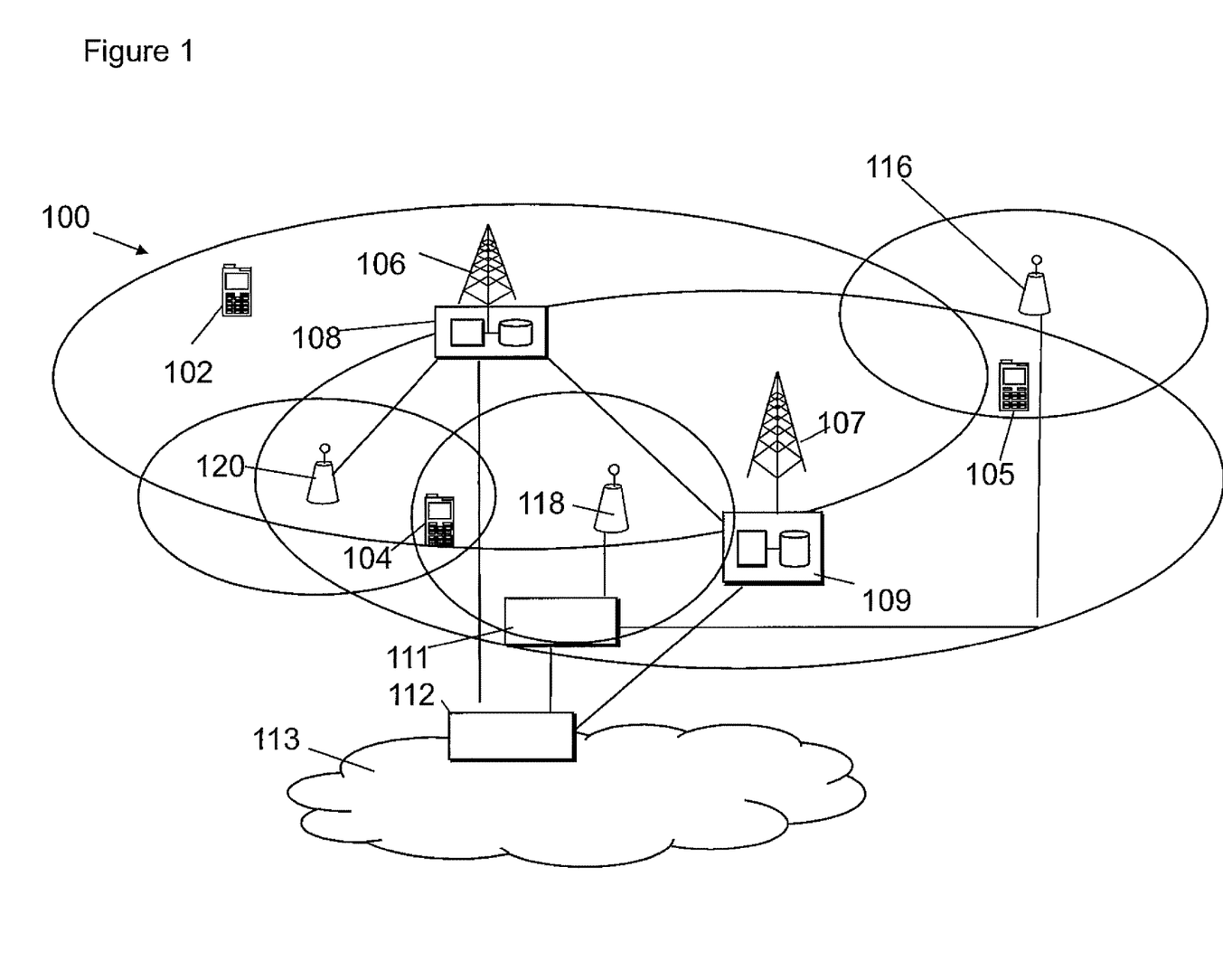
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN Aps.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the Interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3$^{rd}$ Generation Partnership Project (3GPP). The various development stages of the 3GPP specifications are referred to as releases. Base stations of such systems may provide features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperabilty for Microwave Access). A base station may provide coverage for an entire cell or similar radio service area.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more functional entities (or functions), running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 2:
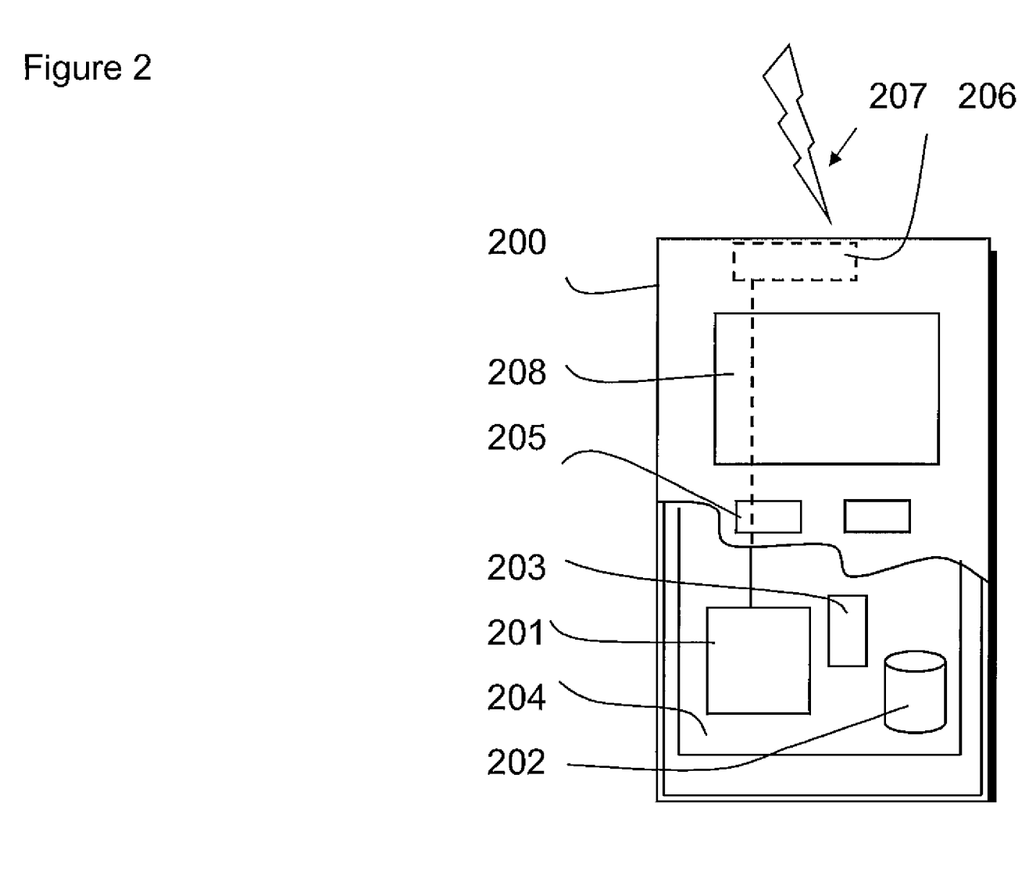
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mall (email), text message, multimedia and so on. Users may thus be offered and provided numerous services via their communication devices. Non-limiting examples of these services comprise two-way or multi-way calls, data communication or multimedia services or simply an access to a data communications network system, such as the internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
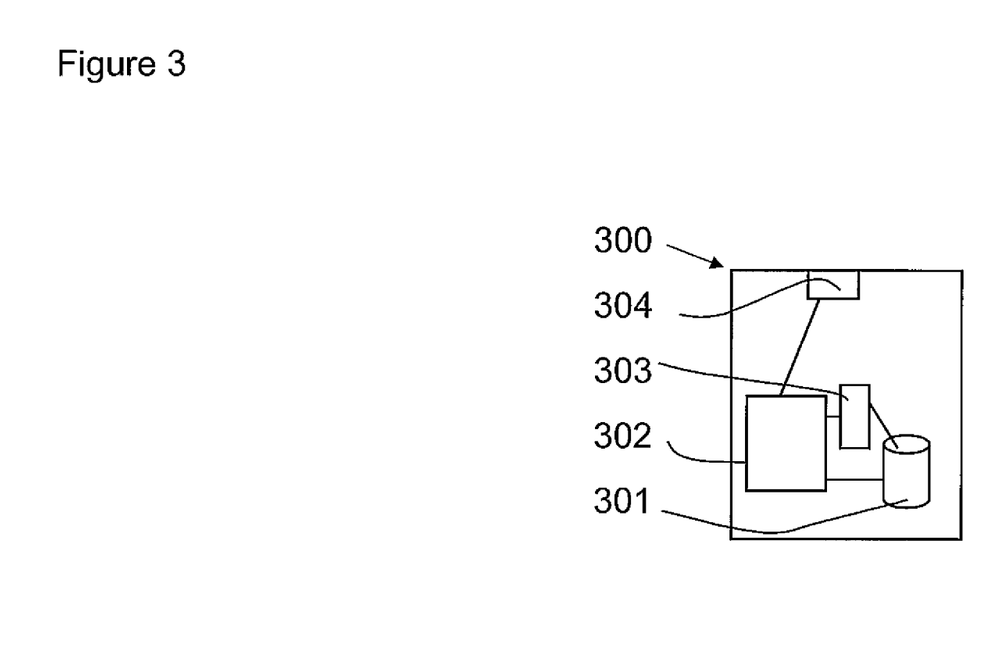
FIG. 3 shows a schematic diagram of an example control apparatus.

FIG. 3 shows an example of a control apparatus for a communication system, for example to be coupled to and/or for controlling a station of an access system, such as a RAN node, e.g. a base station, eNB or gNB or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Figure 4:
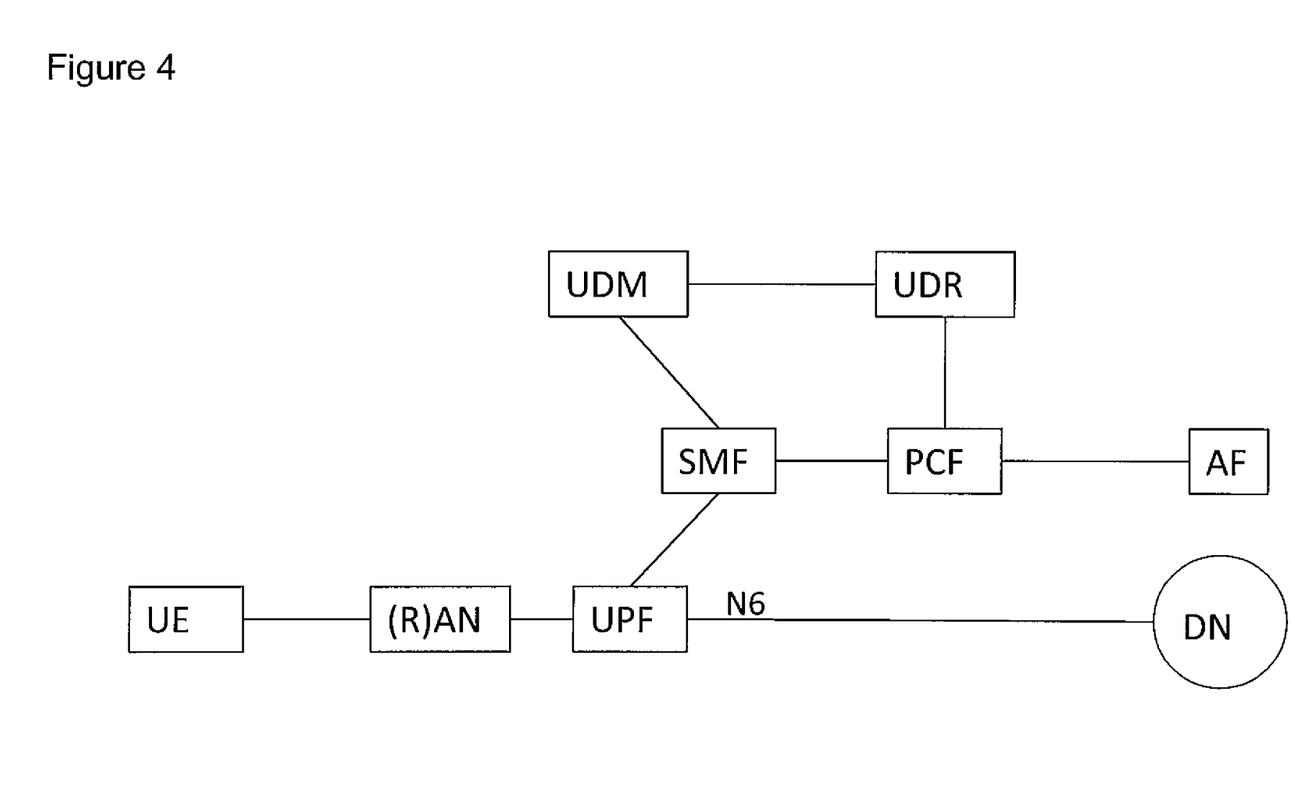
FIG. 4 shows a schematic diagram of part of a 5G core network.

FIG. 4 shows a schematic diagram of selected portions of an example 5G core network (CN) comprising functional entities. The CN is connected to a UE via the radio access network (R)AN.

An UPF (User Plane Function) whose role is called PSA (PDU Session Anchor) may be responsible for forwarding Ethernet frames back and forth between the DN (data network) and the tunnels established over the 5GS towards the UE(s) exchanging Ethernet traffic with the DN.

The UPF is controlled by an SMF (Session Management Function) that receives policies from a PCF (Policy Control Function).

In the case of IP PDU Session type, an AF (Application Function) may send requests to the PCF in order to influence policies sent to the SMF/UPF; these policies target the (IP) address associated with the PDU session of the UE. A PDU session is associated with a very limited number of IP address(es).

The association of the AF session information to a single PDU session is known as session binding. In 5GS, the PCF may perform the session binding. IP PDU session binding may take the following PDU Session parameters into account, the UE IPv4 address and/or IPv6 network prefix, the UE identity (e.g. SUPI), if present, and the information about the Data Network (DN) the user is accessing, e.g. DNN (Data Network Name), if present. The PCF may identify the PCC (Policy and Charging Control) rules (as defined e.g. in 3GPP TS 23.503) affected by the AF session information, including new PCC rules to be installed and existing PCC rules to be modified or removed.

To enable the AF to determine PCF address for a UE IP PDU session, the BSF (Binding Support Function) is specified. The BSF stores the binding information (user identity, DNN, UE IP address(es), PCF address) for a certain PDU Session either locally or in the UDR (Unified Data Repository). The SMF provides the UE IP address assigned for the PDU session to the PCF, and the PCF registers the binding information to the BSF during PDU Session establishment.

5GS may be applied to vertical industries, where Ethernet traffic popularly runs. For 5G, an Ethernet PDU session type has been defined where Ethernet frames are transferred over the 5GS (50 system) between the UE and the Data Network (DN) interface (N6). Providing an AF to influence polices to control Ethernet traffic may be desirable, for example, to encourage vertical applications to utilize 5G technology.

In the case of Ethernet PDU Session type, the addresses used by the UE for the PDU Session may be MAC addresses. For an Ethernet PDU session type the AF may belong to a third party.

It may be desirable to define how an Ethernet AF session is bound to an Ethernet PDU Session. In order to support the binding of an AF session onto an Ethernet PDU session, the MAC addresses used in UL traffic of the PDU Session would be reported by the UPF to the PCF through the SMF. The PCF can them register the binding information (user identity, DNN (Data Network Name as defined e.g. In 3GPP TS 23.501), UE MAC address(es), PCF address) to the BSF The MAC addresses for an Ethernet PDU session may be numerous. For example, the PDU Session may serve to connect a full LAN (i.e. when the UE corresponds to a LAN switch connecting tens or thousands of devices, each with its own MAC address). Populating the BSF (from a UPF that detects the MAC address usage in UL traffic, to the BSF via the SMF and the PCF) with the corresponding MAC addresses may introduce a high signaling load and/or a large storage requirement in the BSF/UDR.

The 5GS operator and the DN owner may have an agreement on whether AF requests targeting an individual MAC address are allowed (thus expected) or not. Based on such agreement, the AF may request policy control for UE PDU session(s) based on MAC address(es).

Figure 5:
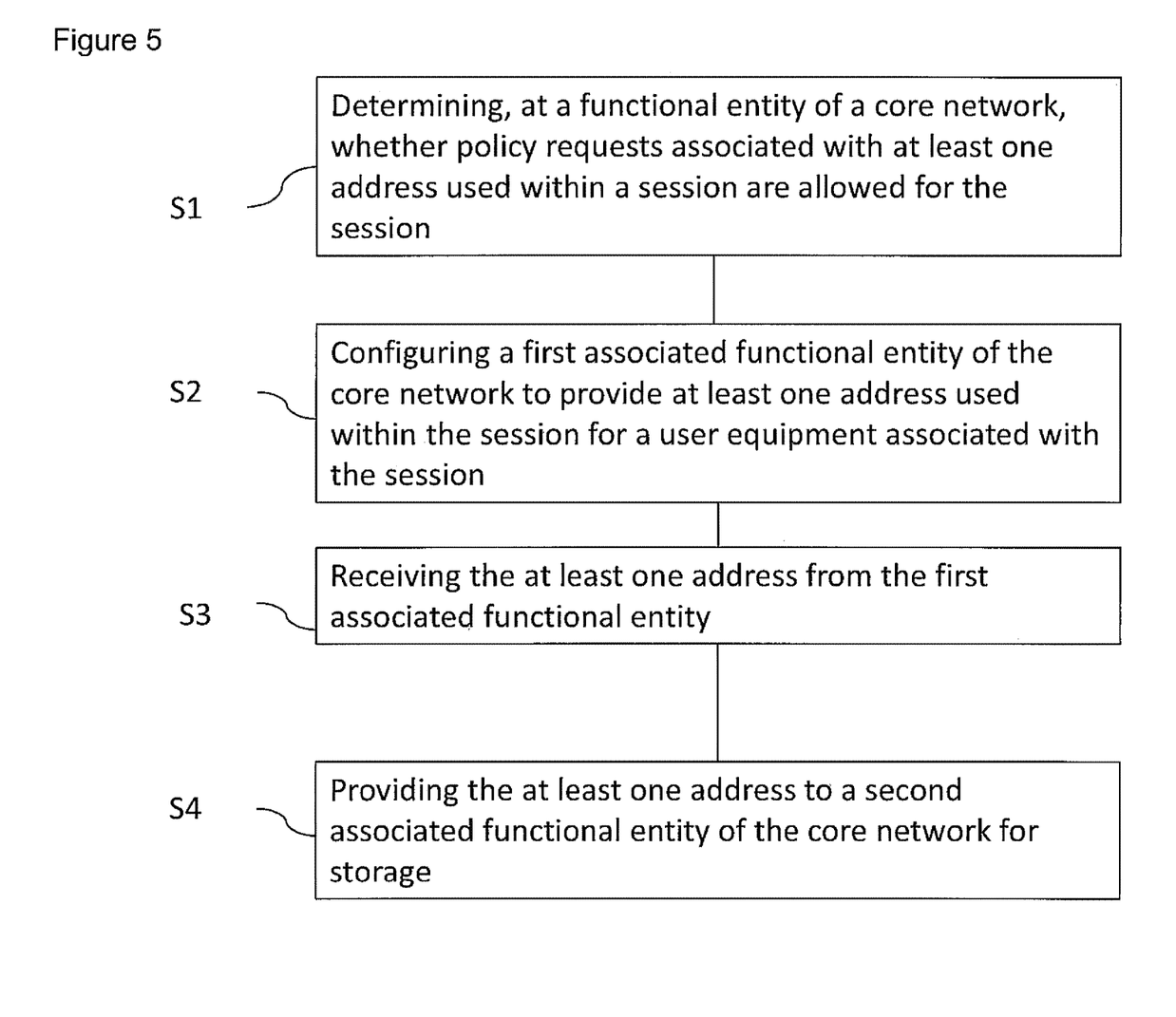
FIG. 5 shows a flowchart of an example method according to an embodiment.

FIG. 5 shows a flowchart of a method according to an example.

In a first step, S1, the method comprises determining, at a functional entity of a core network, whether policy requests associated with at least one address used within a session are allowed for the session.

If so, in a second step, S2, the method comprises configuring a first associated functional entity of the core network to provide at least one address used within the session for a user equipment associated with the session.

In a third step, S3, the method comprises receiving the at least one address from the first associated functional entity.

In a fourth step, S4, the method comprises providing the at least one address to a second associated functional entity of the core network for storage.

A method as described with reference to FIG. 5 may be performed in a functional entity such as an SMF. The first associated functional entity may be a UPF. The second associated functional entity may be a PCF. The session may be an Ethernet PDU session.

Figure 6:
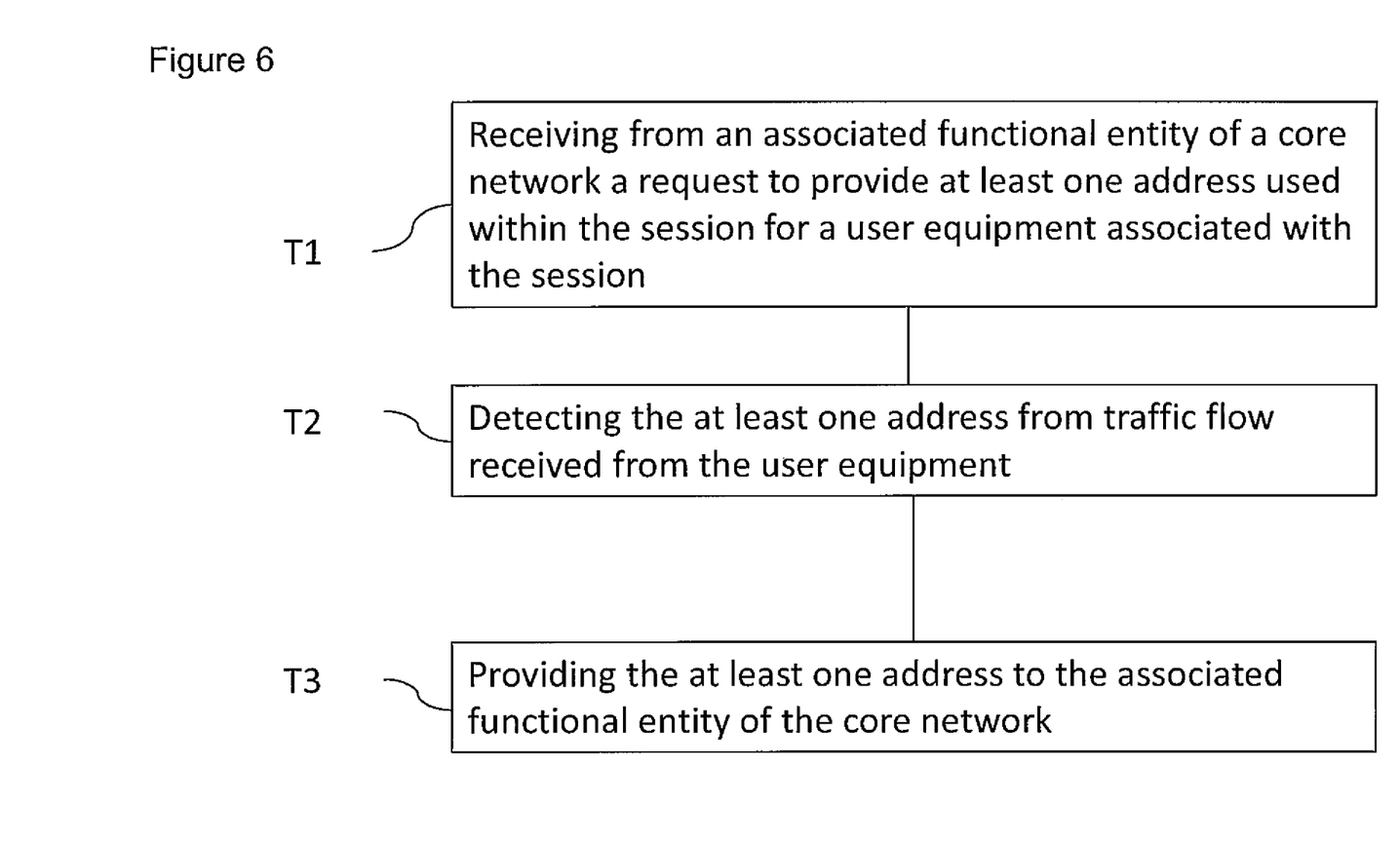
FIG. 6 shows a flowchart of an example method according to an embodiment.

A method as shown in FIG. 6 may be performed at a functional entity such as a UPF. In a first step T1, the method receiving from an associated functional entity of a core network a request to provide at least one address used within the session for a user equipment associated with the session.

In a second step, T2, the method comprises detecting the at least one address from traffic flow received from the user equipment.

In a third step, T3, the method comprises providing the at least one address to the associated functional entity of the core network.

The at least one address may comprise a media access control address.

For example, AF control on a per MAC address basis (i.e. policy requests associated with an address) may be slowed (permitted) for a PDU session. The permission may comprise an agreement between the network operator and the DN owner. For example, the operator and the DN owner have an agreement that AF request(s) targeting some specific MAC address(es) is/are expected/allowed for a particular UE or group of UE Configuring a first associated functional entity of the core network to provide at least one address used within a session for a user equipment associated with the session may comprise the SMF configuring the UPF to report MAC addresses used by the UE in its UL (uplink) traffic. If AF control on a per MAC address basis for a PDU session is not allowed, the UPF is not configured to provide the detected MAC address to the SMF.

Providing the at least one address to a second associated functional entity of the core network for storage may comprise the SMF reporting the UE MAC addresses received from the UPF to the BSF, via the PCF.

Determining whether policy requests associated with at least one address are allowed may comprise receiving an indication at the functional entity, when the session is established, of whether policy requests associated with at least one address are allowed by the network. The indication may be received at the functional entity from the second associated functional entity or from a third associated functional entity of the core network.

For example, the indication may be provided at PDU Session establishment to the SMF by the UDM (as part of subscription data) or by the PCF (as part of per PDU session policy data).

An indication of whether AF control for Ethernet PDU session on a per MAC address basis is allowed may be defined in the UDR.

For example, the indication may be stored in the UDR as the subscription data (and thus retrieved and provided by the UDM) or as policy data (and thus retrieved and provided by the PCF). This indication may be configured to be associated with an individual user or with a Tuple (DNN, S-NSSAI (Single Network Slice Selection Assistance Information) where S-NSSAI is an indicator of a network slice) or with a group of users (e.g. defined by an IMSI group).

Alternatively, or in addition, the indication may be stored in the UDR as UE Subscription data. If so, the UDM provides the indication (whether AF control on a per MAC address basis is allowed on the PDU Session) as part of the UE subscription profile to the SMF during PDU session establishment.

Alternatively, or in addition, the indication may be pre-configured in the SMF.

Whether receiving the indication from the PCF or from the UDM, or by pre-configuration, the SMF subscribes from UPF on the detection of the MAC address(es) received in UL traffic, and the UPF reports the UE MAC address(es) to the SMF once they are detected. The UE MAC address is then reported to the PCF and BSF.

The at least one address may be used for associating policy requests with the session. In an example, the BSF provides the selected PCF for an AF requests targeting to the expected MAC address. The PCF may perform session binding based on the received UE MAC address.

Figure 7:
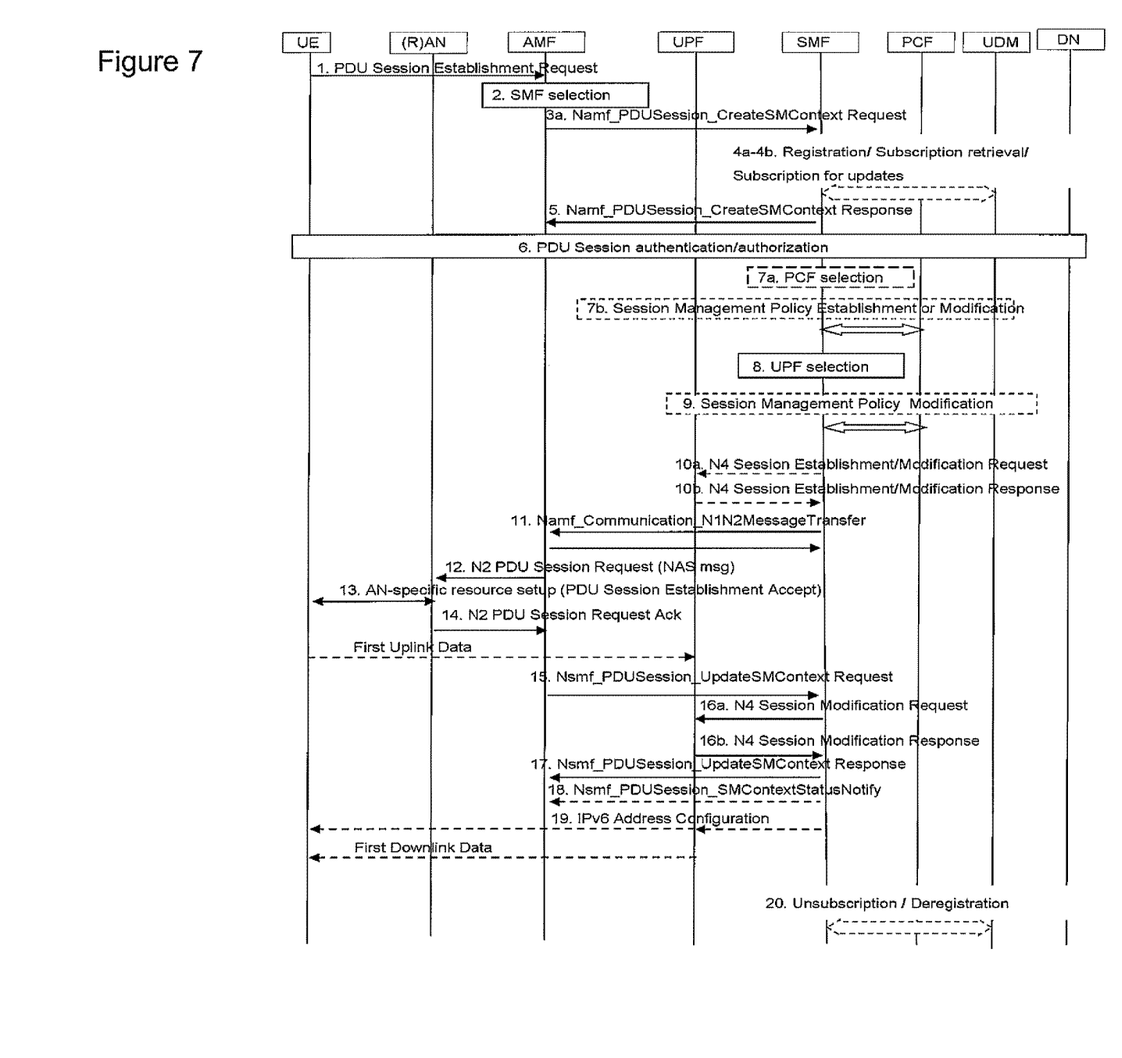
FIG. 7 shows an example signalling flow according to an embodiment.

FIG. 7 shows an example signalling flow for PDU session establishment according to an example.

If the UDM sends the indication to the SMF as part of the UE subscription data, the indication is sent as part of steps 4a and 4b.

In step 10a, when the indication has been received, the SMF subscribes to the detection of UE MAC address(es) from UPF as part of the creation of UPF resources to support the PDU session.

When the indication is provided by the PCF, the SMF requests PCC rule/PDU session related policies from the PCF in step 7b-1. In step 7b-2, the PCF responds with PCC rule/PDU session related policy, including the indication.

Figure 8:
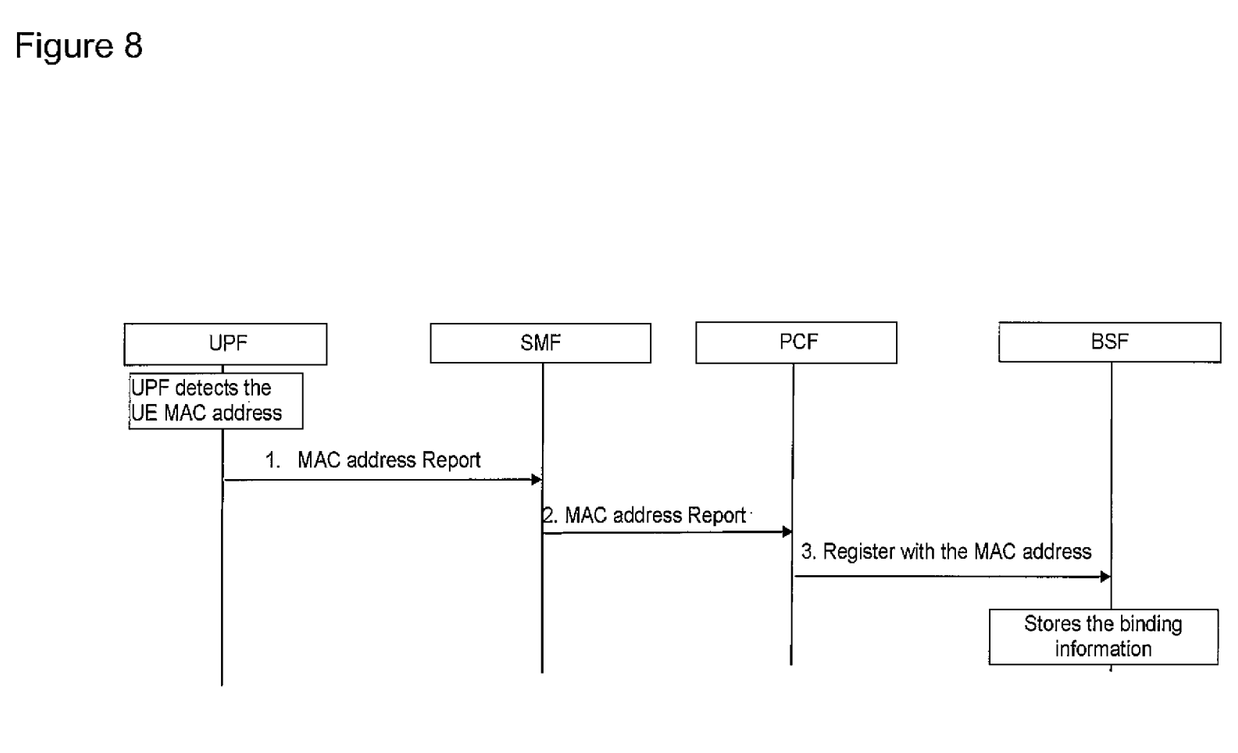
FIG. 8 shows an example signalling flow according to an embodiment.

FIG. 8 shows a signalling flow once the session has been established. The UPF reports the detection of UE MAC address(es) to the SMF. The SMF notifies the PCF with these MAC addresses. The PCF registers the Expected MAC address(es) to the BSF In a method as described with reference to FIGS. 5 to 8, the SMF reports the Ethernet addresses used in a PDU session to the PCF via the BSF only if it has received an explicit policy requiring it to do so. In case there is no such agreement, there is no need to require the signalling intensive reporting of the UE MAC address on the signalling chain between the UPF, SMF, PCF and BSF.

The method may be implemented in a control apparatus as described with reference to FIG. 3. Control functions may comprise determining, at a functional entity of a core network, whether policy requests associated with at least one address used within a session are allowed for the session and, if so, configuring a first associated functional entity of the core network to provide at least one address used within the session for a user equipment associated with the session, receiving the at least one address from the first associated functional entity and providing the at least one address to a second associated functional entity of the core network for storage.

Alternatively or in addition, control functions may comprise receiving from an associated functional entity of a core network a request to provide at least one address used within the session for a user equipment associated with the session, detecting the at least one address from traffic flow received from the user equipment and providing the at least one address to the associated functional entity of the core network.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entitles.

It is noted that whilst embodiments have been described in relation to 5GS and Ethernet, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
   determining, at a functional entity of a core network, whether policy requests associated with one or more addresses used within a session are allowed for the session;
   based on a determination that the policy requests are allowed for the session, configuring a first associated functional entity of the core network to provide at least one address used within the session for a user equipment associated with the session;
   receiving the at least one address from the first associated functional entity; and
   providing the at least one address to a second associated functional entity of the core network for storage.

2. A method according to claim 1, wherein the at least one address comprises a media access control address.

3. A method according to claim 1, wherein the determining of whether the policy requests associated with the one or more addresses are allowed comprises:
   receiving, at the functional entity, an indication when the session is established of whether policy requests associated with the one or more addresses are allowed.

4. A method according to claim 3, wherein the indication is received from the second associated functional entity of the core network or from a third associated functional entity of the core network.

5. A method according to claim 1, wherein the determining of whether the policy requests associated with the one or more addresses are allowed is based on the configuration of the functional entity.

6. A method according to claim 1, wherein the session is an Ethernet protocol data unit session.

7. A method according to claim 1, wherein the at least one address is used for associating the policy requests with the session.

8. A non-transitory computer-readable medium comprising program instructions stored thereon which, when executed with at least one processor, cause the at least one processor to perform the steps of claim 1.

9. A method according to claim 1, wherein the policy requests are from an application function.

10. A method according to claim 1, wherein the one or more addresses comprise one or more addresses the user equipment uses within the session.

11. A method comprising:
    receiving from an associated functional entity of a core network a request to provide at least one address used within a session for a user equipment associated with the session;

detecting the at least one address from traffic flow received from the user equipment; and providing the at least one address to the associated functional entity of the core network.

12. A method according to claim 11, wherein the traffic flow comprises Ethernet frames forwarded between the user equipment and a data network.

13. An apparatus comprising:
at least one processor and at least one non-transitory memory including a computer program code, the at least one memory and the computer program code configured to, with the at least one processor, cause the apparatus at least to:
determine, at a functional entity of a core network, whether policy requests associated with one or more addresses used within a session are allowed for the session;
based on a determination that the policy requests are allowed for the session, configure a first associated functional entity of the core network to provide at least one address used within the session for a user equipment associated with the session;
receive the at least one address from the first associated functional entity; and
provide the at least one address to a second associated functional entity of the core network for storage.

14. An apparatus according to claim 13, wherein determining whether the policy requests associated with the one or more addresses are allowed is based on the configuration of the functional entity.

15. An apparatus according to claim 13, wherein the session is an Ethernet protocol data unit session.

16. An apparatus according to claim 13, wherein the at least one address is used for associating the policy requests with the session.

17. An apparatus according to claim 13, wherein the policy requests are from an application function.

18. An apparatus according to claim 13, wherein the one or more addresses comprise one or more addresses the user equipment uses within the session.

19. An apparatus comprising:
at least one processor and at least one non-transitory memory including a computer program code, the at least one memory and the computer program code configured to, with the at least one processor, cause the apparatus at least to:
receive from an associated functional entity of a core network a request to provide at least one address used within a session for a user equipment associated with the session;
detect the at least one address from traffic flow received from the user equipment; and
provide the at least one address to the associated functional entity of the core network.

20. An apparatus according to claim 19, wherein the traffic flow comprises Ethernet frames forwarded between the user equipment and a data network.

* * * * *